United States Patent [19]

Borman et al.

[11] 4,271,063

[45] Jun. 2, 1981

[54] THERMOPLASTIC MOLDING COMPOSITIONS

[75] Inventors: Willem F. H. Borman; Richard W. Campbell, both of Evansville, Ind.

[73] Assignee: General Electric Company, Pittsfield, Mass.

[21] Appl. No.: 972,888

[22] Filed: Dec. 26, 1978

[51] Int. Cl.³ .............................................. C08L 67/02
[52] U.S. Cl. .................................................. 260/40 R
[58] Field of Search ...................... 260/40 R, 873, 176

[56] References Cited

U.S. PATENT DOCUMENTS 4,172,859  10/1979  Epstein ................................. 525/109

FOREIGN PATENT DOCUMENTS 2622876  9/1976  Fed. Rep. of Germany .

Primary Examiner—Lewis T. Jacobs
Attorney, Agent, or Firm—Morgan, Finnegan, Pine, Foley & Lee

[57] ABSTRACT

A thermoplastic molding composition having improved physical properties is provided, the composition comprising an intimate admixture of a high molecular weight polyester, from about 0.1 to about 25% by weight, based on the total composition, of a copolymer of ethylene and vinyl acetate and a filler, said composition having been prepared by melt blending the polyester, the copolymer and the filler and further reacting the resultant blend in the solid state.

35 Claims, No Drawings

THERMOPLASTIC MOLDING COMPOSITIONS

BACKGROUND OF THE INVENTION

This invention relates to improved thermoplastic molding compositions and, more particularly, to improved thermoplastic polyester molding compositions.

High molecular weight linear polyesters and copolyesters of glycols and terephthalic or isophthalic acid have been available for a number of years. These are described inter alia in Whinfield et al, U.S. Pat. No. 2,465,319, and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly(ethylene terephthalate) has become an important constituent of injection-moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

Recently, block copolyesters, wherein the major portion of the repeating units are poly(1,4-butylene terephthalate) blocks, have been found to have enhanced impact resistance.

U.S. Pat. No. 3,937,757 teaches that the tracking resistance of unfilled poly(1,4-butylene terephthalate) compositions can be improved by the addition of from 5 to 50% by weight of a polyolefin or ethylene copolymer, containing at least 50% by weight ethylene units, thereto.

It has now been surprisingly discovered that if a polyester, a copolymer of ethylene and vinyl acetate, and a filler are intimately admixed by melt blending and the admixture post-reacted in the solid state, thermoplastic compositions exhibiting vastly improved impact resistance, as well as other excellent properties, such as high tensile strength, high flexural moduli and low warp are provided.

DETAILED DESCRIPTION OF THE INVENTION

According to this invention then, there are provided thermoplastic compositions which are useful for molding or extrusion, e.g., injection molding, injection blow molding, compression molding, transfer molding, profile extrusion, sheet extrusion, wire coating, extrusion blow molding and the like, the composition having improved physical properties, such as impact resistance, said compositions comprising an intimate admixture:

(a) a high molecular weight polyester;

(b) from about 0.1 to 25% by weight, based on the weight of the total composition of a copolymer of ethylene and vinyl acetate; and (c) a filler, said intimate admixture of components (a), (b) and (c) having been provided by melt-blending the components and then post reacting the resultant blend in the solid state by heating the solid blend to a temperature below the melting temperature of the blend in a vacuum or in a stream of inert gas.

The high molecular weight polyesters, preferably high molecular weight linear polyesters, used in the practice of the present invention are polymeric glycol esters of terephthalic acid and may include minor amounts of glycol esters of other difunctional acids, such as isophthalic, adipic, and the like. They are available commercially or can be prepared by known techniques, such as by the alcoholysis of esters of terephthalic acid with a glycol and subsequent polymerization, by heating glycols with the free acids or with halide derivatives thereof, and similar processes. These are described in U.S. Pat. No. 2,465,319 and U.S. Pat. No. 3,047,539, and elsewhere.

Although the glycol portion of the polyester can contain from two to ten carbon atoms, it is preferred that it contain from 2 to 4 carbon atoms in the form of linear methylene chains.

Preferred polyesters will be of the family consisting essentially of high molecular weight, polymeric glycol terephthalates having repeating units of the general formula:

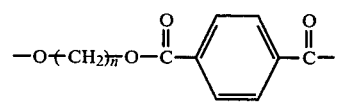

wherein n is a whole number of from two to four, and mixtures of such esters, including copolyesters of terephthalic and other difunctional acids like isophthalic, adipic and the like of up to about 15 mole percent of these other difunctional acid units.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate). Mixtures of these high molecular weight polyesters are also contemplated herein and preferably a mixture of poly(1,4-butylene terephthalate) and poly(ethylene terephthalate).

Illustratively, high molecular weight poly(ethylene terephthalate) (PET) will have an intrinsic viscosity of at least about 0.4 deciliters/gram, while high molecular weight poly(butylene terephthalate) (PBT) will have an intrinsic viscosity of at least 0.7 deciliters/gram as measured in a 60:40 phenol tetrachloroethane mixture at 30° C. At intrinsic viscosities of at least about 0.6 deciliters/gram for PET and 0.9 deciliters/gram for PBT, there is a further enhancement in toughness of the present compositions.

Block copolyesters are also useful in the compositions of this invention. These are generally prepared by the reaction of terminally-reactive poly(butylene terephthalate), preferably, low molecular weight, and a terminally-reactive copolyester or polyester in the presence of a catalyst for transesterification, such as zinc acetate, manganese acetate, titanium esters, and the like. The terminal groups can comprise hydroxyl, carboxyl, carboalkoxy, and the like, including reactive derivatives thereof. After initial mixing, polymerization is carried out under standard conditions, e.g., 220° to 280° C., in a high vacuum, e.g., 0.1 to 2 mm Hg, to form the block copolymer of minimum randomization in terms of distribution of chain segments. These copolyesters are described in copending U.S. application Ser. No. 752,325, filed on Dec. 20, 1976, incorporated herein by reference. For eample, these block copolyesters are derived from (i) a terminally-reactive poly(1,4-butylene terephthalate) and (ii) a terminally-reactive aromatic/aliphatic copolyester of a dicarboxylic acid selected from the group consisting of terephthalic acid, isophthalic acid, napthalene dicarboxylic acids, phenyl indane dicarboxylic acid and compounds of the formula:

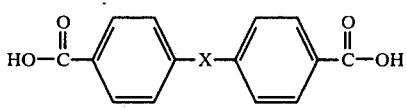

in which X may be alkylene or alkylidene of from 1 to 4 carbon atoms, carbonyl, sulfonyl, oxygen or a bond between the benzene rings, and an aliphatic dicarboxylic acid having from 6 to 12 carbon atoms in the chain and one or more straight or branched chain dihydric aliphatic glycols having from 4 to 10 carbon atoms in the chain, said copolyester having at least 10% of aliphatic units being derived from a dicarboxylic acid, or (iii) a terminally-reactive aliphatic polyester of a straight chain aliphatic dicarboxylic acid having from 4 to 12 carbon atoms in the chain and a straight or branched chain aliphatic glycol, said blocks being connected by inter-terminal linkages consisting essentially of ester linkages;

The copolymers of ethylene and vinyl acetate useful in the practice of this invention may be derived from two or more monomers. Thus, the term "copolymers" herein is intended to include terpolymers and so on. Illustrative copolymers of ethylene and vinyl acetate contemplated herein include, for example, Alathon 3892, now referred to as Alathon 3194 (25% by weight vinyl acetate, 75% by weight ethylene), Alathon 3152 (15% by weight vinyl acetate, 85% by weight ethylene), Alathon 3180 (28% by weight vinyl acetate, 72% by weight ethylene), Vynathene EY903 (45% by weight vinyl acetate, 55% by weight ethylene) and Vynathene EY904 (52% by weight vinyl acetate and 48% by weight ethylene). The Alathons are products of the DuPont Chemical Co. and the Vynathenes are products of U.S.I. Chemicals. Among the terpolymers useful herein are included, for example, those prepared from ethylene, vinyl acetate and carbon monoxide (EL-VALOY 741 or 742, sold by duPont), ethylene, vinyl acetate and methacrylic acid and ethylene, vinyl acetate and acrylic acid (ELVAX 4260 and 4355 available from duPont), and the like.

For the purposes of this invention, the copolymer of ethylene and vinyl acetate is employed in amounts of from about 0.1 to about 25% by weight of the total composition. Particularly preferred amounts for best overall properties are in the range of from about 3 to about 10% by weight.

In another embodiment of the present invention, from 1 to about 30% by weight of the total composition, of an amorphous polymer may optionally be intimately added to the composition. The addition of the amorphous polymer provides a composition with high impact strength and reduced shrinkage. Amorphous polymers found satisfactory include copolymers of ethylene glycol, terephthalic acid and/or isophthalic acid (or derivatives thereof), and cyclohexane dimethanol; and copolymers of terephthalic acid and/or isophthalic acid (or derivatives thereof) and cyclohexane dimethanol (Kodar A-150, available from Eastman).

A wide variety of fillers can be used in the thermoplastic compositions of this invention. Representative of these fillers are included clays, like kaolin and calcined clays, silicas, such as novaculites, ground sands and amorphous glasses; mica, talc, pyrophillites, mineral wools, wollastonites and mixtures of the same. Clays and especially treated kaolin clays, such as that known as Translink-445, available from the Freeport Kaolin Company, are preferred herein. Amounts of from about 5% to about 40% by weight of the total composition, of filler are contemplated herein. Preferably 10–30% by weight of filler is used. Typical treating agents for clay are gamma-aminopropyltriethoxysilane, gamma-glycidoxypropyltrimethoxysilane and beta(3,4-epoxycyclohexyl)ethyltrimethoxysilane.

In accordance with the present invention and in order to form an intimate admixture of the polyester, the copolymer of ethylene and vinyl acetate, and the filler like clay, the compositions are prepared by melt blending the components. Using poly(1,4-butylene terephthalate), ethylene-vinyl acetate copolymer and clay as representative components, this procedure is carried out, for example, by blending the poly(1,4-butylene terephthalate) in an extruder with the ethylene-vinyl acetate copolymer and filler at a temperature of from about 240° C. to about 290° C. The extruded strands of the blended composition are cooled and, if desired, can be pelletized. To further improve the properties of the composition, the composition or pellets are then post reacted in the solid state by heating, for example at 200°–205° C., in a vacuum or in a stream of inert gas, such as nitrogen, at a temperature slightly below the melting point of the composition to further increase the melt viscosity of the composition and to improve the adhesion between the polymer phases (8 to 30 degrees below the melting temperature is generally considered to be "slightly below"). Generally, the heating is carried out until the melt viscosity of the blend is from about 4,000 to 25,000 poises when measured at 250° C. When poly(butylene terephthalate) is used melt viscosities in excess of 6,000 poises are preferred. By so doing, optimized improved mechanical properties, such as impact strength, are realized. Alternatively, the post-reaction step may be eliminated with the same end results if the residence time of the composition in the extruder is extended, for example one to two minutes depending on the temperature and pressure and, if necessary, by repeated passings through the extruder to provide the heat history that results in improved adhesion between the phases of the composition. The post reaction process can be carried out, for example, in a static chamber, a tumbler and preferably even a fluidized bed. In the fluid bed procedure, the pellets are fluidized by a stream of heated inert gas, such as nitrogen, from below.

If the optional amorphous polymer is used in the compositions of this invention also containing poly(1,4-butylene terephthalate) resin, the intrinsic viscosity of the poly(1,4-butylene terephthalate) resin is preferably in the range of from about 0.7 to 1.0 deciliters/gram as measured in a 60:40 phenoltetrachloroethane mixture at 30° C. In addition, in the solid state post reaction treatment the components are heated to a temperature slightly below the melting temperature in a stream of inert gas, like nitrogen, until the melt viscosity of the blended material reaches at least 8000 poises when measured at 250° C.

The compositions of this invention are comprised of an intimate admixture of the polyester, the copolymer of ethylene and vinyl acetate and the filler. More particularly, the thermoplastic compositions of this invention are comprised of a matrix of the polyester, such as poly(1,4-butylene terephthalate), having small inclusions or domains of the copolymer of ethylene and vinyl acetate and also small inclusions or domains of the filler, such as clay. The inclusions of copolymer and filler are each in the order of about 0.1 to about 10 microns, preferably about 0.5 to about 5 microns in size. It is believed that there is a small amount, for example less than 10%, of surface grafting at the interface of the polyester and copolymer components.

The compositions of this invention can be molded in any equipment conventionally used for thermoplastic compositions. For example, with poly(1,4-butyleneterephthalate), good results will be obtained in an injection molding machine, e.g., the Van Dorn type with conventional cylinder temperature, e.g., 450° F.–520° F., and conventional mold temperatures, e.g., 150° F. On the other hand, with poly(ethylene terephthalate), because of its low rate of crystallization, somewhat less conventional but still well-known techniques can be used. For example, a nucleating agent such as graphite or a metal oxide, e.g., ZnO or MgO, can be included and standard mold temperature of at least 230° F. will be used.

In order that those skilled in the art may better understand how to practice the present invention, the following examples are given by way of illustration and not by way of limitation.

EXAMPLES 1–4

The following formulations are prepared by melt blending the ingredients, extruding the blend to give pellets, and post reacting the pellets in the solid state in a stream of nitrogen gas. The properties of the molded compositions are also summarized in the table below.

TABLE

| Example | 1 | 2 | 3 | 4 |
| --- | --- | --- | --- | --- |
| Ingredients | | | | |
| (parts by weight) | | | | |
| Valox 295[1] | 63 | — | 1290 | — |
| Valox 310[2] | — | — | — | 2400 |
| Polyethylene terephthalate | — | 3140 | 600 | — |
| Alathon 3892 | 7 | 350 | 210 | 400 |
| kaolin clay treated with gamma-aminopropyl-triethoxysilane (Translink-445) | 30 | 1500 | 900 | — |
| Min-U-Sil (crystalline silica, P.G.S. Corporation) | — | — | — | 1200 |
| Ferro 904[3] | — | 2.5 | — | — |
| Irganox 1093[4] | — | 7.5 | — | — |
| Properties | | | | |
| Notched Izod Impact ft. lb./in. | 1.5 | 1.65 | 1.04 | 1.28 |
| Flexural Strength (psi) | 12,453 | 11,605 | 12,017 | 10,986 |
| Flexural modulus (psi) | 456,706 | 458,290 | 458,656 | 384,041 |
| Tensile Strength (psi) | 6938 | 6860 | 6963 | 6,019 |
| Elongation % | 24.4% | 98.6 | 9.76 | 16.2 |
| Gardener Impact in.-lbs. | 276 | 300 | 200 | 120 |

TABLE-continued

| Example | 1 | 2 | 3 | 4 |
| --- | --- | --- | --- | --- |
| DTUL °F. at 264 psi | 170 | — | 150 | 143 |

[1] poly(1,4-butylene terephthalate) about 0.7–0.8 intrinsic viscosity measured in solution of phenol and tetrachloroethane (60:40) at 30° C. available from G.E.
[2] poly(1,4-butylene terephthalate) about intrinsic viscosity measured in a solution of phenol and tetrachloroethane (60:40) at 30° C. available from G.E.
[3] diphenyl decylphosphite.
[4] tetrakis(3,5-di-t-butyl-4-hydroxyphenylpropionyloxymethyl) methane.

EXAMPLE 5

2250 parts by weight of Valox 310, 1250 parts by weight of ELVALOY 742, and 1500 parts by weight of Translink-445 are melt-blended in an extruder to give pellets. The pellets are then post reacted in the solid state at a temperature slightly below the melting temperature of the blend in a stream of nitrogen gas. The post reaction is continued until the melt viscosity of the blend is about 16,000 poises. Molded pieces therefrom have the following physical properties:

| | |
| --- | --- |
| Notched Izod Impact ft. lb./in | 1.9 |
| Flexural Strength (psi) | 5050 |
| Flexural modulus (psi) | 134,300 |
| Tensile Strength (psi) | 3600 |
| Elongation % | 32 |
| Gardner Impact in. lbs. | 100 |
| DTUL at psi °F. | 100 |

EXAMPLE 6

90 parts by weight of Valox 295 and 10 parts by weight of Alathon 3892 are melt-blended by passing the same through a 1¾ inch vacuum vented extruder at 500°–525° F. for about 30 seconds. 69.7 parts by weight of the resultant blend and 30.3 parts by weight of calcined kaolin clay (SATINTONE-Special, Engelhard Chemicals) treated with 1% gamma-aminopropyltriethoxysilane are passed through the same extruder at the same temperature. The melt viscosity of the final blend is about 6,000 poises measured at 250° F. Molded pieces therefrom have the following physical properties:

| | |
| --- | --- |
| Notched Izod Impact ft.lb./in. | 1.4 |
| Flexural Strength (psi) | 13,000 |
| Flexural Modulus (psi) | 450,000 |
| Tensile Strength (psi) | 7,000 |
| Elongation % | 18 |
| Gardner Impact in. lbs. | 350 |

Obviously, other modifications and variations of the present invention are possible in light of the above teachings. For example, small amounts of materials such as dyes, pigments, stabilizers, reinforcing agents, flame-retardants, plasticizers and the like, can be added to the present compositions. It is to be understood, therefore, that changes may be made in the particular embodiments of the invention described which are within the full intended scope of the invention as defined by the appended claims.

We claim:

1. A thermoplastic molding composition having improved physical properties, th composition comprising an intimate admixture of (a) high molecular weight polyester resin;

(b) from about 0.1 to about 25% by weight, based on the total weight of the composition, of a copolymer consisting of ethylene and vinyl acetate; and (c) a filler;

said intimate admixture of components (a), (b) and (c) having been provided by melt-blending the components and post-reacting the resultant blend in the solid state by heating the solid blend to a temperature below the melting temperature of the blend in a vacuum or in a stream of inert gas.

2. A composition as defined in claim 1 wherein the polyester is a high molecular weight linear polyester.

3. A composition as defined in claim 1 wherein component (c) comprises from about 5 to about 40% by weight.

4. A composition as defined in claim 1 wherein said copolymer contains less than 50% by weight vinyl acetate, the remainder ethylene.

5. A composition as defined in claim 1 wherein said copolymer contains more than 50% by weight vinyl acetate, the remainder ethylene.

6. A composition as defined in claim 1 which further includes an amorphous polymer.

7. A composition as defined in claim 1 wherein component (a) is poly(1,4-butylene terephthalate) resin.

8. A composition as defined in claim 1 wherein component (a) comprises a mixture of poly(1,4-butylene terephthalate) and poly(ethylene terephthalate).

9. A composition as defined in claim 1 wherein said filler is selected from the group consisting of clay, silica, mica, talc, pyrophillite, wollastonite and mineral wool.

10. A composition as defined in claim 1, wherein said filler is clay.

11. A thermoplastic molding composition having improved physical properties, the composition comprising an intimate admixture of:

(a) poly(1,4-butylene terephthalate) resin;

(b) about 7% by weight, of the total composition, of a copolymer of ethylene and vinyl acetate containing 25% by weight vinyl acetate, the remainder ethylene; and (c) clay in an amount of about 30% by weight of the total composition, said intimate admixture of components (a), (b) and (c) having been provided by melt blending the components and then post reacting the resultant blend in the solid state by heating the solid blend to a temperature below the melting temperature of the blend in a vacuum or in a stream of inert gas.

12. A composition as defined in claim 11, wherein said clay has been treated with a surface treating agent.

13. A composition as defined in claim 11 wherein said clay has been treated with gamma-aminopropyltriethoxysilane.

14. A thermoplastic molding composition having improved physical properties, the composition comprising an intimate admixture of (a) high molecular weight polyester resin;

(b) from about 0.1 to about 25% by weight, based on the total weight of the composition, of a copolymer consisting of ethylene and vinyl acetate; and (c) a filler;

said intimate admixture of components (a), (b) and (c) having been provided by melt-blending the components in an extruder for an extended period of time.

15. A composition as defined in claim 14 wherein the the melt-blending is carried out by repeated passings through an extruder.

16. A composition as defined in claim 14 wherein said polyester is poly(1,4-butylene terephthalate) resin, said copolymer is comprised of 25% by weight vinyl acetate, the remainder ethylene; and said filler is clay.

17. A composition as defined in claim 16 wherein said copolymer is present in an amount of about 7% by weight of the total composition and said clay is present in an amount of about 30% by weight of the total composition.

18. A thermoplastic molding composition having improved physical properties, the composition comprising a matrix of polyester resin having inclusion of particles of copolymer consisting of ethylene and vinyl acetate and inclusions of particles of filler, said inclusions of copolymer and filler being in the order of from about 0.1 to about 10 microns in size.

19. A composition as defined in claim 18 wherein there is a small amount of surface grafting at the interface of the polyester resin and the copolymer.

20. A composition as defined in claim 18 wherein said filler is clay.

21. A composition as defined in claim 20 wherein said clay has been surface treated with gamma-aminopropyltriethoxysilane and said copolymer is comprised of 25% by weight vinyl acetate, the remainder ethylene.

22. A thermoplastic molding composition having improved physical properties, the composition comprising an intimate admixture of:

(a) poly(ethylene terephthalate) resin;

(b) from about 0.1 to about 25% by weight, based on the total weight of the composition, of a copolymer consisting of ethylene and vinyl acetate; and (c) a filler;

said intimate admixture of components (a), (b) and (c) having been provided by melt-blending the components and post-reacting the resultant blend in the solid state by heating the solid blend to a temperature below the melting temperature of the blend in a vacuum or in a stream of inert gas.

23. A thermoplastic molding composition having improved physical properties, the composition comprising an intimate admixture of:

(a) poly(ethylene terephthalate) resin;

(b) about 7% by weight, based on the total weight of the composition, of a copolymer of ethylene and vinyl acetate containing 25% by weight vinyl acetate, the remainder ethylene; and (c) clay in an amount of about 30% by weight of the total composition;

said intimate admixture of components (a), (b) and (c) having been provided by melt blending the components and then post reacting the resultant blend in the solid state by heating the solid blend to a temperature below the melting temperature of the blend in a vacuum or in a stream of inert gas.

24. A thermoplastic molding composition having improved physical properties, the composition comprising an intimate admixture of (a) poly(ethylene terephthalate) resin;

(b) from about 0.1 to about 25% by weight, based on the total weight of the composition, of a copolymer consisting of ethylene and vinyl acetate; and (c) a filler;

said intimate admixture of components (a), (b) and (c) having been provided by melt-blending the components in an extruder for an extended period of time.

25. A composition as defined in claim 24 wherein the melt-blending is carried out by repeated passings through an extruder.

26. A process for preparing a thermoplastic molding composition having improved physical properties, said process comprising the steps of:
(i) melt-blending a high molecular weight polyester resin, from about 0.1 to about 25% by weight, based on the total weight of the composition, of a copolymer consisting of ethylene and vinyl acetate and a filler; and
(ii) post reacting the resultant blend in the solid state by heating the solid blend to a temperature below the melting temperature of the blend in a vacuum or in a stream of inert gas.

27. A process as defined in claim 26 wherein the polyester is a high molecular weight linear polyester.

28. A process as defined in claim 27 wherein said high molecular weight linear polyester is poly(1,4-butylene terephthalate) resin.

29. A process as defined in claim 27 wherein said high molecular weight linear polyester is poly(ethylene terephthalate) resin.

30. A process as defined in claim 27 wherein said high molecular weight linear polyester is a mixture of poly(1,4-butylene terephthalate) and poly(ethylene terephthalate).

31. A process for preparing a thermoplastic molding composition having improved physical properties, said process comprising the step of melt-blending a high molecular weight polyester resin, from about 0.1 to about 25% by weight, based on the total weight of the composition, of a copolymer consisting of ethylene and vinyl acetate and a filler in an extruder for an extended period of time.

32. A process as defined in claim 31 wherein the melt-blending is carried out by repeated passings through an extruder.

33. A process as defined in claim 31 wherein said high molecular weight polyester resin is poly(1,4-butylene terephthalate).

34. A process as defined in claim 31 wherein said high molecular weight polyester resin is poly(ethylene terephthalate).

35. A process as defined in claim 31 wherein said high molecular weight polyester resin is a mixture of poly(ethylene terephthalate) and poly(1,4-butylene terephthalate).

* * * * *

UNITED STATES PATENT AND TRADEMARK OFFICE
CERTIFICATE OF CORRECTION

PATENT NO. : 4,271,063
DATED : June 2, 1981
INVENTOR(S) : Willem F. H. Borman, et al.

It is certified that error appears in the above—identified patent and that said Letters Patent is hereby corrected as shown below:

At Column 6, line 29, "DTUL at psi °F" should be

--DTUL at 264 psi °F--.

Signed and Sealed this

Eighteenth Day of December 1984

[SEAL]

Attest:

Attesting Officer

GERALD J. MOSSINGHOFF
Commissioner of Patents and Trademarks